United States Patent [19]
Dent

[11] Patent Number: 5,151,919
[45] Date of Patent: Sep. 29, 1992

[54] CDMA SUBTRACTIVE DEMODULATION

[75] Inventor: Paul W. Dent, Stehag, Sweden

[73] Assignee: Ericsson-GE Mobile Communications Holding Inc., Paramus, N.J.

[21] Appl. No.: 628,359

[22] Filed: Dec. 17, 1990

[51] Int. Cl.⁵ ............................................. H04K 1/00
[52] U.S. Cl. .................................................. 375/1
[58] Field of Search ............................................ 375/1

[56] References Cited

U.S. PATENT DOCUMENTS 4,901,307 2/1990 Gilhousen et al. .
4,984,247 1/1991 Kaufmann et al. .

OTHER PUBLICATIONS

"Very Low Rate Convolution Codes for Maximum Theoretical Performance of Spread-Spectrum Multiple-Access Channels", Andrew J. Viterbi, IEEE Journal on Selected Areas in Communications, vol. 8, No. 4, May 1990, pp. 641–649.

Primary Examiner—Thomas H. Tarcza
Assistant Examiner—David Cain
Attorney, Agent, or Firm—Burns, Doane, Swecker & Mathis

[57] ABSTRACT

Substractive CDMA demodulation optimally decodes a coded information signal embedded in may other overlapping signals making up a received, composite signal. A radio receiver correlates a unique code corresponding to the desired signal to be decoded with the composite signal. Moreover, after each information signal is successfully decoded, it is recoded and removed from the composite signal. As a result, subsequent correlations are performed with greater accuracy. Substractive CDMA demodulation is enhanced by decoding the composite signal in the order of strongest to weakest signal strength. Interference caused by the presence of the strongest information signal and the composite signal during the decoding of weaker signals is removed. The individual information signals are assigned a unique block error correction code with is correlated with the composite signal using Fast Walsh transforms. Correlated signals are recoded using inverted Fast Walsh transforms and removed from the composite signal.

35 Claims, 10 Drawing Sheets

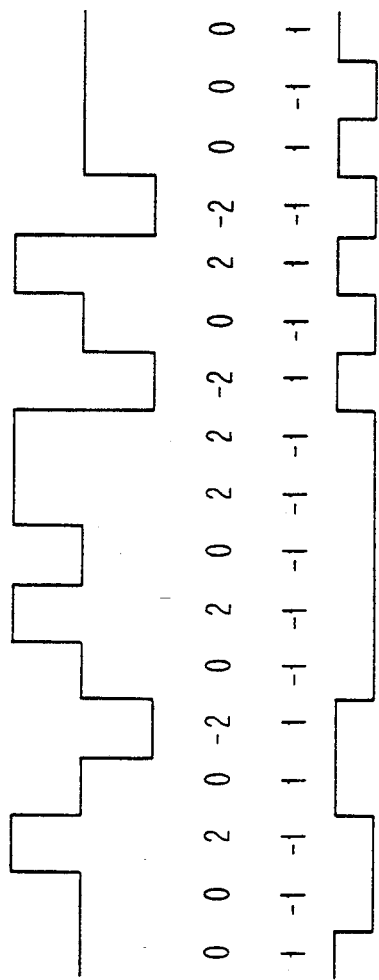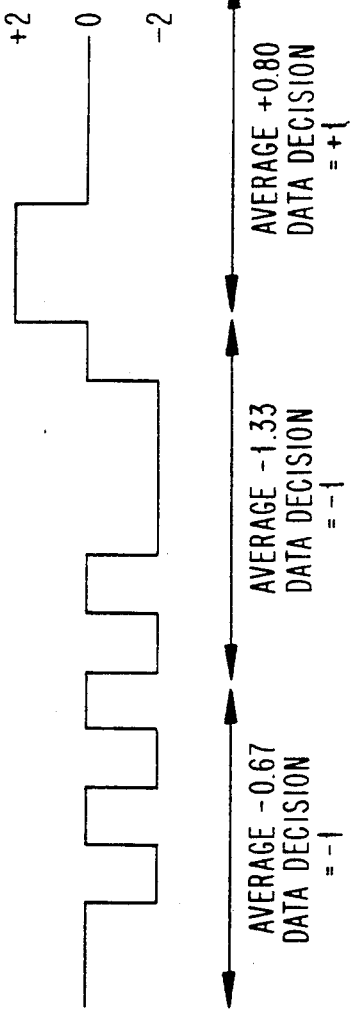
Fig. 4

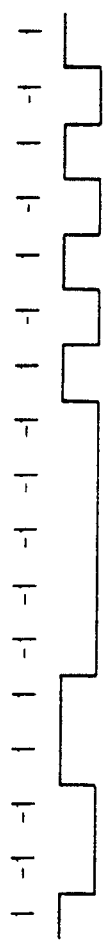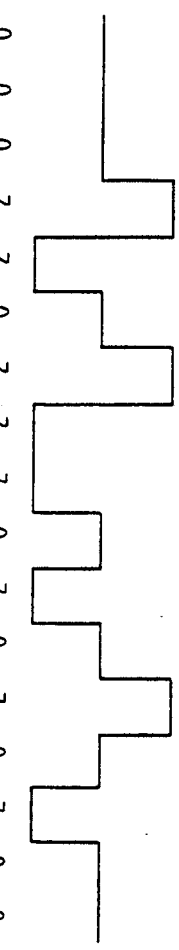
(a) SIGNAL 2 RECONSTRUCTED.
(b) CODE FOR SIGNAL 2.
(c) CODED SIGNAL 2 RECONSTRUCTED.
(d) SUM SIGNAL RECEIVED.
(e) SUBTRACT RECONSTRUCTED CODED SIGNAL 2 FROM SUM LEAVING CODED SIGNAL 1.
(f) MULTIPLY WITH SIGNAL 1 CODE.
Fig. 5

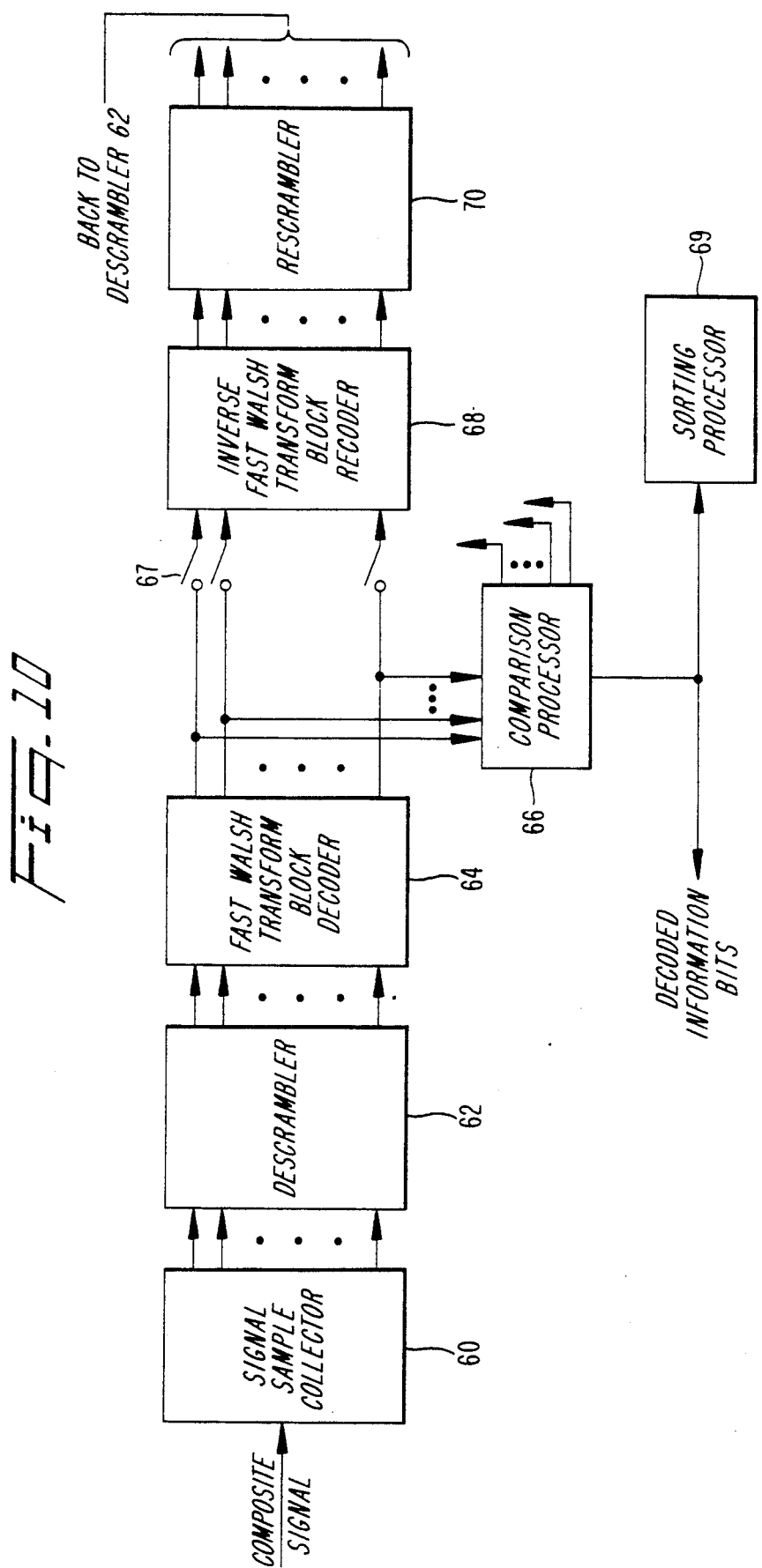

CDMA SUBTRACTIVE DEMODULATION

FIELD OF THE INVENTION

The present invention relates to the use of Code Division Multiple Access (CDMA) communications techniques in cellular radio telephone communication systems, and more particularly, to an enhanced CDMA demodulation scheme based on successive signal subtractions of multiple CDMA signals in signal strength order.

BACKGROUND OF THE INVENTION

The cellular telephone industry has made phenomenal strides in commercial operations in the United States as well as the rest of the world. Growth in major metropolitan areas has far exceeded expectations and is outstripping system capacity. If this trend continues, the effects of rapid growth will soon reach even the smallest markets. Innovative solutions are required to meet these increasing capacity needs as well as maintain high quality service and avoid rising prices.

Throughout the world, one important step in cellular systems is to change from analog to digital transmission. Equally important is the choice of an effective digital transmission scheme for implementing the next generation of cellular technology. Furthermore, it is widely believed that the first generation of Personal Communication Networks (PCN), (employing low cost, pocket-size, cordless telephones that can be carried comfortably and used to make or receive calls in the home, office, street, car, etc.), would be provided by the cellular carriers using the next generation digital cellular system infrastructure and the cellular frequencies. The key feature demanded in these new systems is increased traffic capacity.

Currently, channel access is achieved using Frequency Division Multiple Access (FDMA) and Time Division Multiple Access (TDMA) methods. As illustrated in FIG. 1(a), in FDMA, a communication channel is a single radio frequency band into which a signal's transmission power is concentrated. Interference with adjacent channels is limited by the use of band pass filters which only pass signal energy within the specified frequency band. Thus, with each channel being assigned a different frequency, system capacity is limited by the available frequencies as well as by limitations imposed by channel reuse.

In TDMA systems, as shown in FIG. 1(b), a channel consists of a time slot in a periodic train of time intervals over the same frequency. Each period of time slots is called a frame. A given signal's energy is confined to one of these time slots. Adjacent channel interference is limited by the use of a time gate or other synchronization element that only passes signal energy received at the proper time. Thus, the problem of interference from different relative signal strength levels is reduced.

Capacity in a TDMA system is increased by compressing the transmission signal into a shorter time slot. As a result, the information must be transmitted at a correspondingly faster burst rate which increases the amount of occupied spectrum proportionally.

With FDMA or TDMA systems or hybrid FDMA/TDMA systems, the goal is to insure that two potentially interfering signals do not occupy the same frequency at the same time. In contrast, Code Division Multiple Access (CDMA) allows signals to overlap in both time and frequency, as illustrated in FIG. 1(c). Thus, all CDMA signals share the same frequency spectrum. In either the frequency or the time domain, the multiple access signals appear to be on top of each other. In principal, the informational data stream to be transmitted is impressed upon a much higher bit rate data stream generated by a pseudo-random code generator. The informational data stream and the high bit rate data stream are combined by multiplying the two bit streams together. This combination of the higher bit rate signal with the lower bit rate data stream is called coding or spreading the informational data stream signal. Each informational data stream or channel is allocated a unique spreading code. A plurality of coded information signals are transmitted on radio frequency carrier waves and jointly received as a composite signal at a receiver. Each of the coded signals overlaps all of the other coded signals, as well as noise-related signals, in both frequency and time. By correlating the composite signal with one of the unique codes, the corresponding information signal is isolated and decoded.

There are a number of advantages associated with CDMA communication techniques. The capacity limits of CDMA-based cellular systems are projected to be up to twenty times that of existing analog technology as a result of the properties of a wide band CDMA system, such as improved coding gainmmodulation density, voice activity gating, sectorization and reuse of the same spectrum in every cell. CDMA is virtually immune to multi-path interference, and eliminates fading and static to enhance performance in urban areas. CDMA transmission of voice by a high bit rate decoder insures superior, realistic voice quality. CDMA also provides for variable data rates allowing many different grades of voice quality to be offered. The scrambled signal format of CDMA completely eliminates cross talk and makes it very difficult and costly to eavesdrop or track calls, insuring greater privacy for callers and greater immunity from air time fraud.

Despite the numerous advantages afforded by CDMA, the capacity of conventional CDMA systems is limited by the decoding process. Because so many different user communications overlap in time and frequency, the task of correlating the correct information signal with the appropriate user is complex. In practical implementations of CDMA, capacity is limited by the signal-to-noise ratio (S/N), which is essentially a measure of the interference caused by other overlapping signals as well as background noise. The problem to be solved, therefore, is how to increase system capacity and still be able to maintain a reasonable signal-to-noise ratio so that signal decoding can be carried out efficiently and accurately.

SUMMARY OF THE INVENTION

The present invention resolves the above-mentioned problems using a subtractive CDMA demodulation technique. In order to optimally decode a coded information signal embedded in many other overlapping signals making up a received composite signal, a radio receiver correlates a unique code corresponding to the signal to be decoded with the composite signal. After each information signal is decoded, it is recoded and removed from the composite signal. As a result, subsequent correlations of other information signals in the received composite signal can be performed with less interference and, therefore, with greater accuracy.

The subtractive demodulation technique is enhanced by decoding the composite signal in an order of the information signals from strongest to weakest signal strength. In other words, the strongest signal is correlated and removed first. Interference caused by the presence of the strongest information signal in the composite signal during the decoding/correlation of weaker signals is thereby removed. Thus, the chances of accurately decoding even the weakest signal is greatly improved.

In a preferred embodiment of the invention, the encoding of the individual information signals is carried out by assigning each signal a unique, block-error correction code which may be readily correlated using a Fast Walsh Transformation circuit. Correlated signals are recoded by repeating the Fast Walsh Transformation a second time so they may be removed from the composite signal.

BRIEF DESCRIPTION OF THE DRAWINGS

The present invention will now be described in more detail with reference to preferred embodiments of the invention, given only by way of example, and illustrated in the accompanying drawings, in which:

FIGS. 3 and 4 show a series of graphs for illustrating how CDMA signals are decoded;

FIG. 5 shows a series of graphs illustrating CDMA subtractive demodulation according to the present invention;

FIG. 10 is a functional schematic of a further embodiment of the CDMA subtractive demodulator according to the present invention.

DETAILED DESCRIPTION OF THE PREFERRED EMBODIMENTS

While the following description is in the context of cellular communications systems involving portable or mobile radio telephones and/or personal communication networks, it will be understood by those skilled in the art that the present invention may be applied to other communications applications.

The present invention will now be described in conjunction with the signal graphs shown in FIGS. 2-4 which set forth example waveforms in the coding and decoding processes involved in traditional CDMA systems. Using these same waveform examples from FIGS. 2-4, the improved performance of the present invention over conventional CDMA is illustrated in FIG. 5.

Figure 1A:
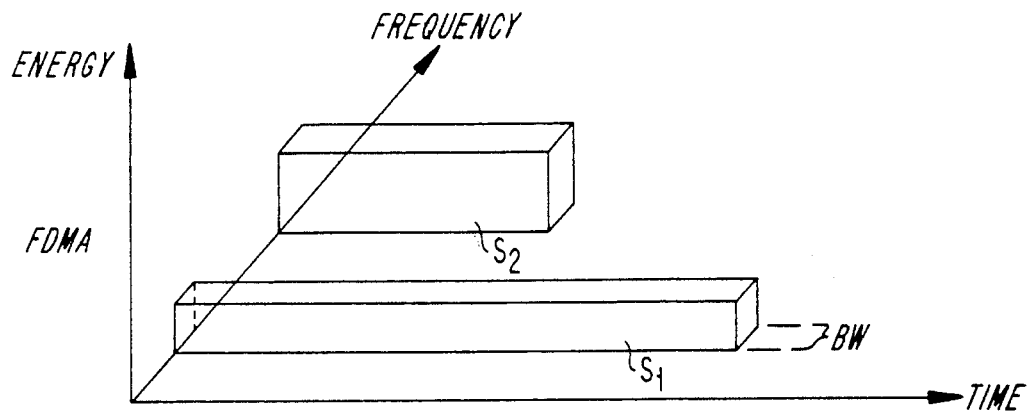
FIGS. 1(a)-1(c) are plots of access channels using different multiple access techniques.
Figure 1B:
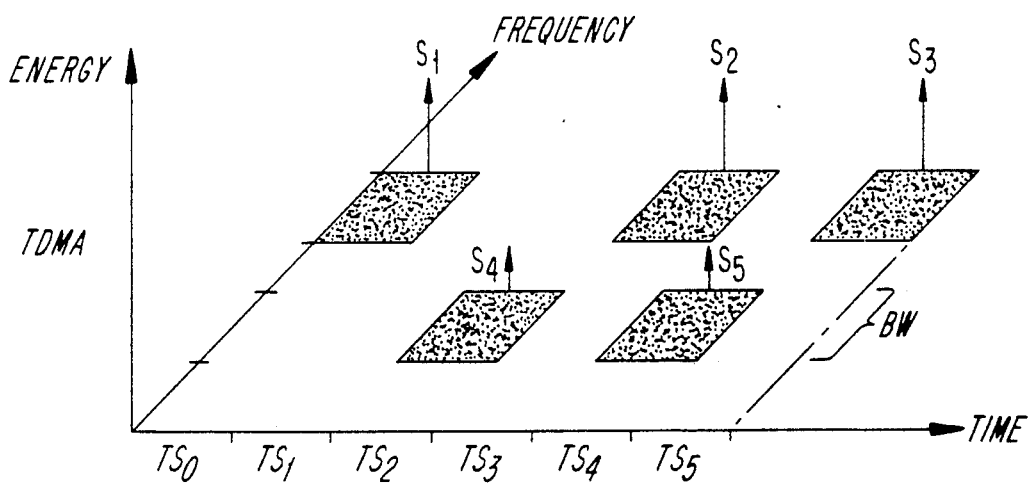
Figure 1C:
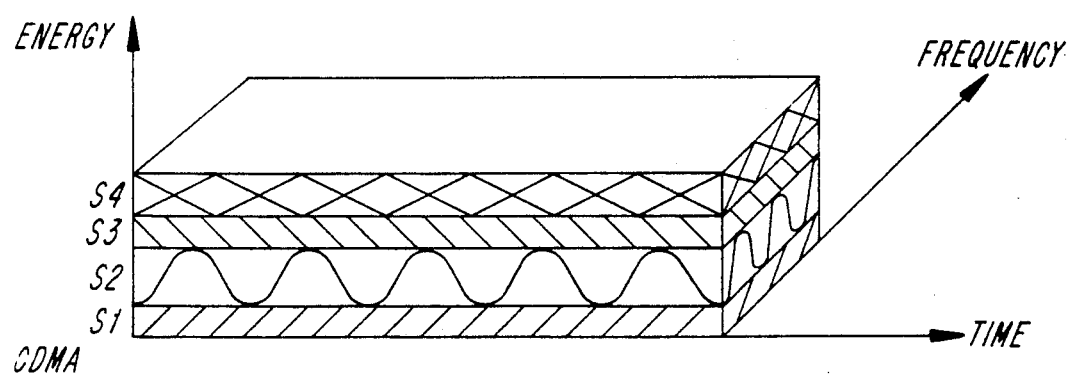
Figure 2:
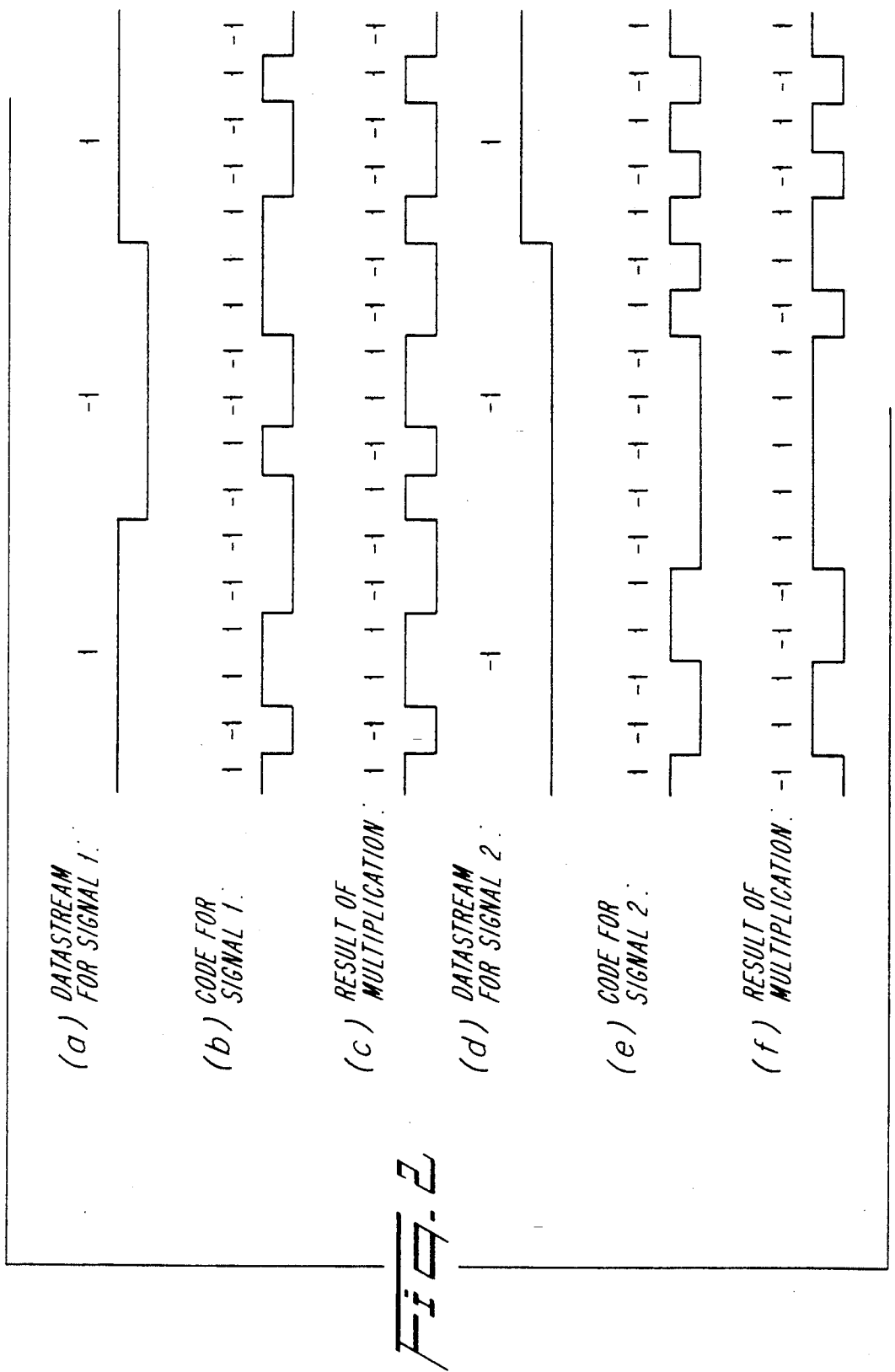
FIG. 2 shows a series of graphs illustrating how CDMA signals are generated.

Two different data streams, shown in FIG. 2 as signal graphs (a) and (d), represent digitized information to be communicated over two separate communication channls. Signal 1 is modulated using a high bit rate, digital code unique to signal 1 as shown in signal graph (b). For purposes of the present invention, the term "bit" refers to one digit of the information signal. The term "bit period" refers to the time period between the start and the finish of the bit signal. The term "chip" refers to one digit of the high rate coding signal. Accordingly, the chip period refers to the time period between the start and the finish of the chip signal. Naturally, the bit period is much greater than the chip period. The result of this modulation, which is essentially the product of the two signal waveforms, is shown in the signal graph (c). In Boolean notation, the modulation of two binary waveforms is essentially an exclusive-OR operation. A similar series of operations is carried out for signal 2 as shown in signal graphs (d)-(f). In practice, of course, many more than two; coded information signals are spread across the frequency spectrum available for cellular telephone communications.

Each coded signal is used to modulate a RF carrier using any one of a number of modulation techniques, such as Quadrature Phase Shift Keying (QPSK). Each modulated carrier is transmitted over an air interface. At a radio receiver, such as a cellular base station, all of the signals that overlap in the allocated frequency bandwidth are received together. The individually coded signals are added, as represented in the signal graphs (a)-(c) of FIG. 3, to form a composite signal waveform.

After demodulation of the received signal to the appropriate baseband frequency, the decoding of the composite signal takes place. Signal 1 may be decoded or despread by multiplying the received composite signal in the signal graph (c) with the unique code used originally to modulate signal 1, as shown in the signal graph (d). The resulting signal is analyzed to decide the polarity (high or low, $+1$ or $-1$, "1" or "0") of each information bit period of the signal.

These decisions may be made by taking an average or majority vote of the chip polarities during one bit period. Such "hard decision" making processes are acceptable as long as there is no signal ambiguity. For example, during the first bit period in the signal graph (f), the average chip value is $+0.67$ which readily indicates a bit polarity $+1$. Similarly, during the subsequent bit period, the average chip value is $-1.33$. As a result, the bit polarity was most likely a $-1$. Finally, in the third bit period, the average is $+0.80$ which indicates a bit polarity of $+1$. However, whenever the average is zero, the majority vote or averaging test fails to provide an acceptable polarity value.

In ambiguous situations, a "soft decision" making process must be used to determine the bit polarity. For example, an analog voltage proportional to the received signal after despreading may be integrated over the number of chip periods corresponding to a single information bit. The sign or polarity of the net integration result indicates that the bit value is a $+1$ or $-1$.

The decoding of signal 2, similar to that of signal 1, is illustrated in the signal graphs (a)-(d) of FIG. 4. After decoding, there are no ambiguous bit polarity situations.

Theoretically, this decoding scheme can be used to decode every signal that makes up the composite signal. Ideally, the contribution of unwanted, interfering signals is minimized if the digital spreading codes are orthogonal to the unwanted signals. Two codes are orthogonal if exactly one half of their bits are different. Unfortunately, only a certain number of orthogonal codes exist for a finite word length. Another problem is that orthogonality can be maintained only when the relative time alignment between two signals is strictly maintained. In communications environments where portable radio units are moving constantly, such as in cellular systems, time alignment is difficult to achieve.

When code orthogonality cannot be guaranteed, noise-based signals may interfere with the actual bit sequences produced by different code generators, e.g., the mobile telephone. In comparison with the originally coded signal energies, however, the energy of the noise signals is usually small. The term "processing gain" is often used to compare relative signal energies. Processing gain is defined as the ratio of the spreading or coding bit rate to the underlying information bit rate. Thus, the processing gain is essentially the spreading ratio. The higher the coding bit rate, the wider the information is spread and the greater the spreading ratio. For example, a one kilobit per second information rate used to modulate a one megabit per second coding signal has processing gain of 1000:1.

Large processing gains reduce the chance of decoding noise signals modulated using uncorrelated codes. For example, processing gain is used in military contexts to measure the suppression of hostile jamming signals. In other environments, such as cellular systems, processing gain refers to suppressing other, friendly signals that are present on the same communications channel with an uncorrelated code. In the context of the present invention, noise includes both hostile and friendly signals. In fact, noise is defined as any other signals other than the signal of interest, i.e., the signal to be decoded. Expanding the example described above, if a signal-to-interference ratio of 10:1 is required, and the processing gain is 1000:1, conventional CDMA systems have the capacity to allow up to 101 signals to share the same channel. During decoding, 100 of the 101 signals are suppressed to 1/1000th of their original interfering power. The total interference energy is thus 100/1000 or 1/10 as compared to the desired information energy of one (1). With the information signal energy ten times greater than the interference energy, the information signal may be correlated accurately.

Together with the required signal-to-interference ratio, the processing gain determines the number of allowed overlapping signals in the same channel. That this is still the conventional view of the capacity limits of CDMA systems may be gleaned by reading, for example, "On the Capacity of a Cellular CDMA System," by Gilhousen, Jacobs, Viterbi, Weaver and Wheatley, *Trans. IEE on Vehicular Technology*, November 1990.

In contrast to the conventional view, an important aspect of the present invention is the recognition that the suppression of friendly CDMA signals is not limited by the processing gain of the spread spectrum demodulator as is the case with the suppression of military type jamming signals. A large percentage of the other signals included in a received, composite signal are not unknown jamming signals or environmental noise that cannot be correlated. Instead, most of the noise, as defined above, is known and is used to facilitate decoding the signal of interest. The fact that most of these noise signals are known, as are their corresponding codes, is used in the present invention to improve system capacity and the accuracy of the signal decoding process.

Rather than simply decode each information signal from the composite signal, the present invention also removes each information signal from the composite signal after it has been decoded. Those signals that remain are decoded only from the residual of the composite signal. Consequently, the existence of signal transmissions in the communications channel from the already decoded signals do not interfere with the decoding of other signals. For example, in FIG. 5, if signal 2 has already been decoded as shown in the signal graph (a), the coded form of signal 2 can be reconstructed as shown in the signal graphs (b) and (c) and subtracted from the composite signal in the signal graph (d) to leave coded signal 1 in the signal graph (e). Signal 1 is recaptured easily by multiplying the coded signal 1 with code 1 to reconstruct signal 1. It is significant that had the conventional CDMA decoding method been unable to determine whether the polarity of the information bit in the third bit period of signal 1 was a +1 or a −1 in the signal graph (f) of FIG. 3, the decoding method of the present invention would effectively resolve that ambiguity simply by removing signal 2 from the composite signal.

Figure 6:
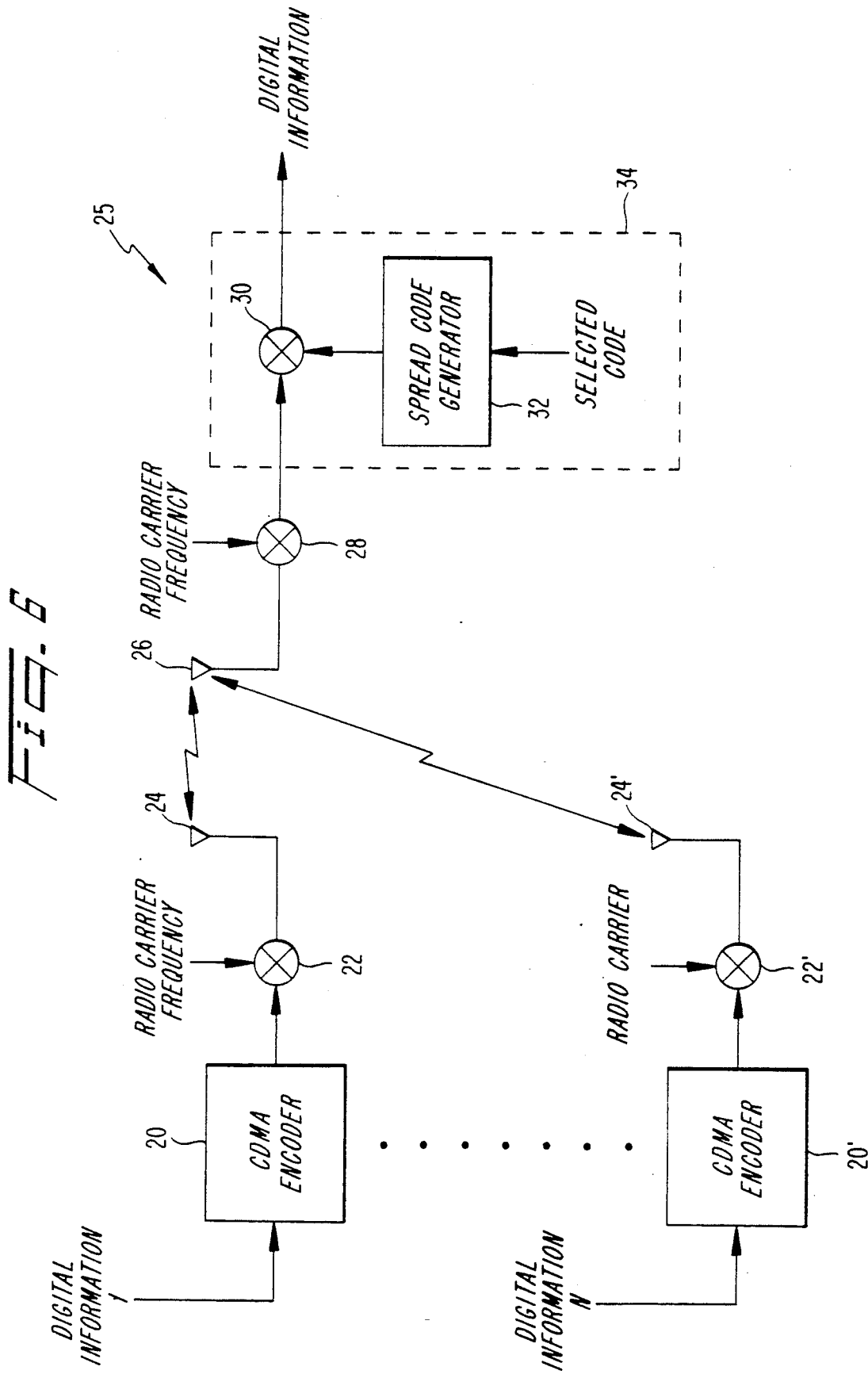
FIG. 6 is a functional schematic of a CDMA transmitter and receiver.

FIG. 6 illustrates a conventional CDMA system. Digital information 1 to be transmitted over an RF communications channel is coded in a CDMA encoder 20. The coded signal is used to modulate an RF carrier in a mixer 22. The modulated carrier is transmitted over the air interface via a transmitting antenna 24. Other digital information from other transmitters (2 . . . N) may be transmitted in a similar fashion. A receiving antenna 26 of a radio receiver 25 receives a composite, RF signal and demodulates the composite signal using another mixer 28. The desired signal is extracted from the composite signal by multiplying the corresponding code used to originally code the desired signal in the CDMA encoder 20 with the composite signal. In theory, only the appropriate signal is correlated and reconstructed in a decoder 34.

Figure 7:
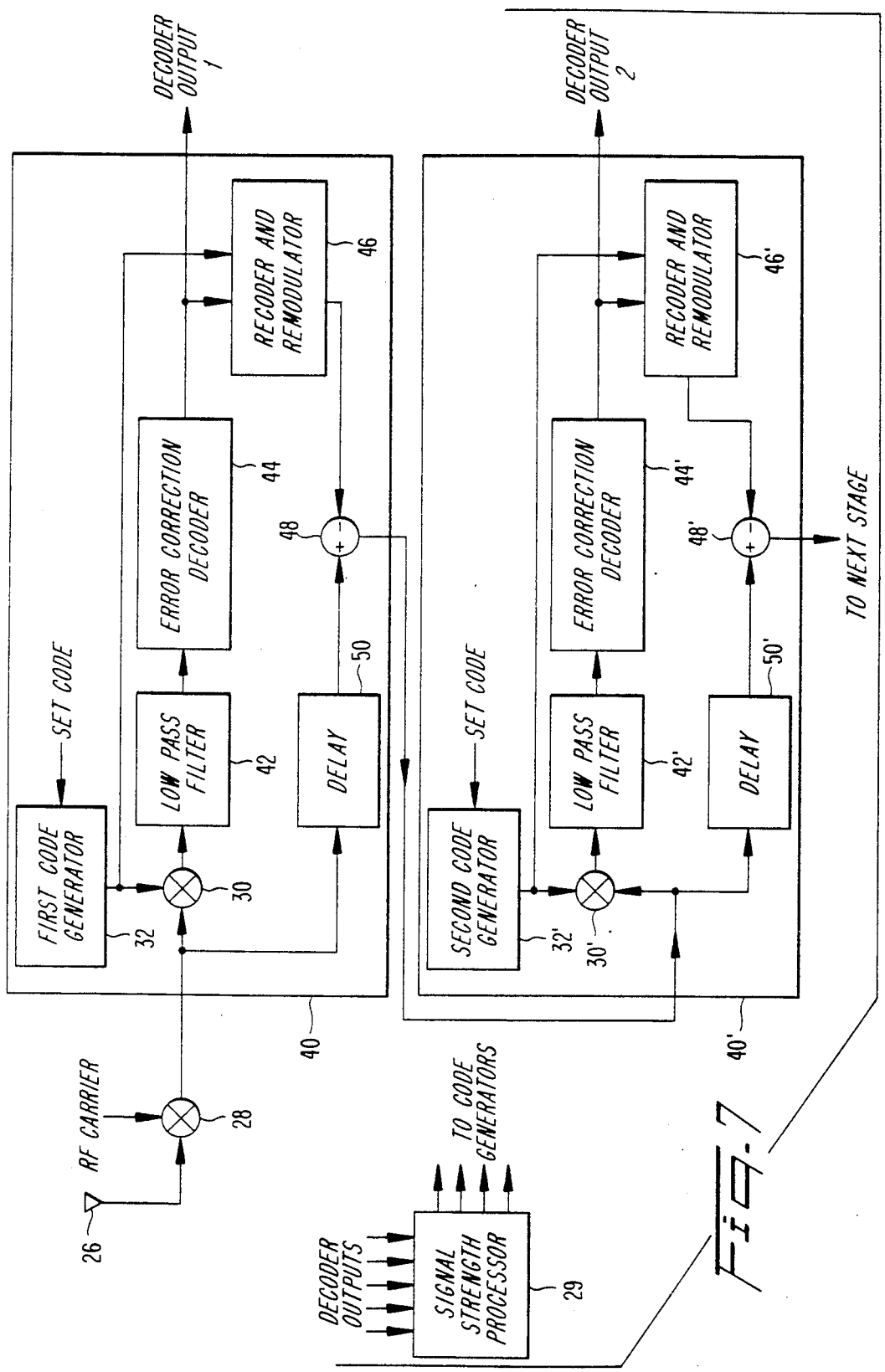
FIG. 7 is a functional schematic of a CDMA subtractive demodulator according to the present invention.

A detailed embodiment of the decoder 34 will now be described in conjunction with FIG. 7. A multiplicity of coded signals overlapping in the same communications channel is received at the antenna 26 as a composite, RF signal. The demodulator 28 converts the received RF signal to a convenient frequency for processing. Such a convenient frequency may, for example, lie around zero frequency (DC), and the composite signal may consist of complex factor components having real and imaginary or I and Q components.

A first digital processing block 40 includes a first code generator 32 set to match the code of the first signal to be demodulated. While the specific code to be set by the code generator 32 in the first data processing block 40 may be selected arbitrarily, in the preferred embodiment of the present invention, the order in which the codes are generated is based on signal strength. A signal strength processor 29 monitors the relative signal strengths of each of the signals that make up the composite signal. In the context of cellular systems, if the mobile switching center (MSC) or the base stations (BS) monitors the probable or actual signal strengths of each mobile telephone communication, either the MSC or the BS may perform the tasks of the signal strength processor 29.

Figure 8:
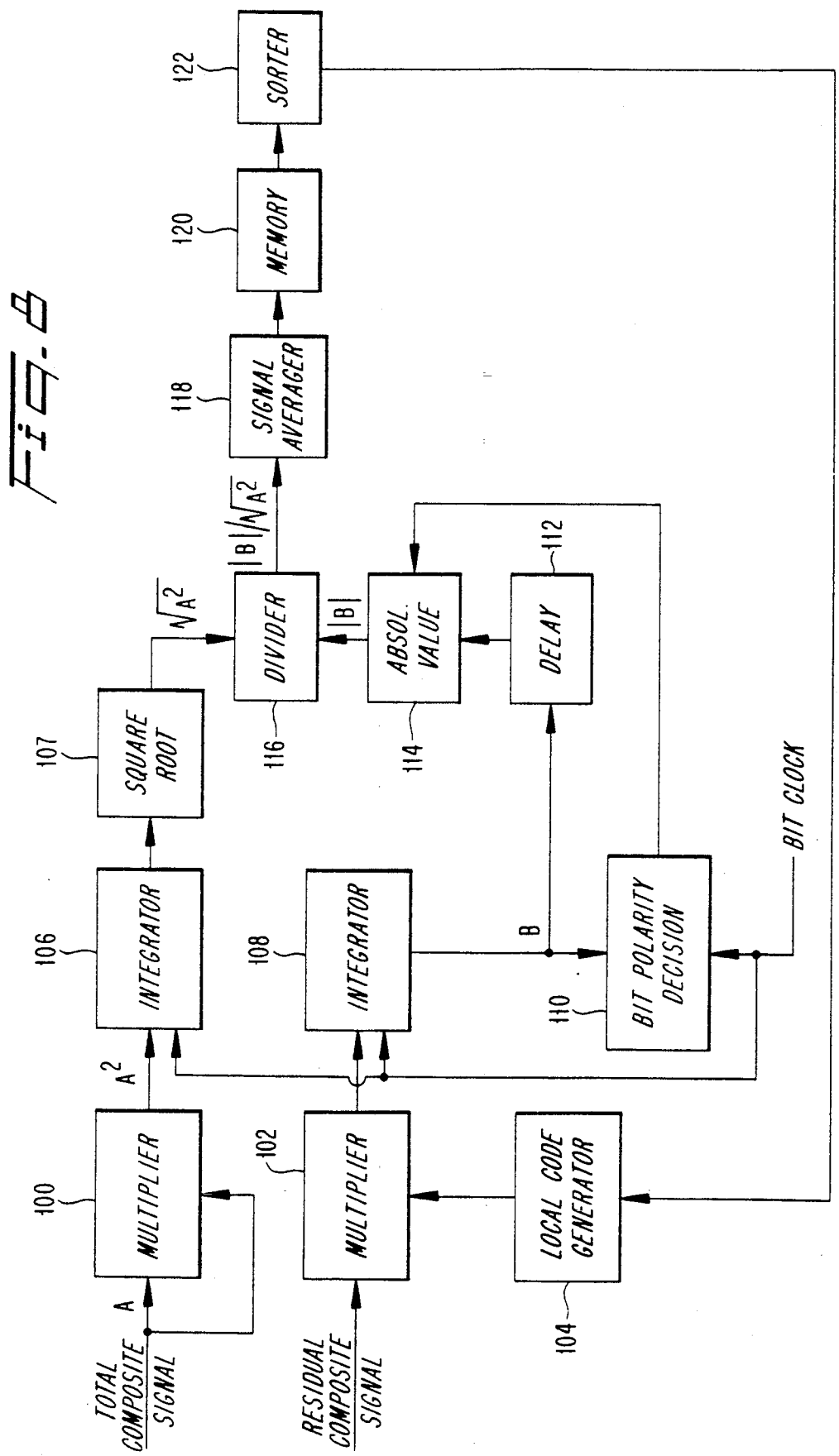
FIG. 8 is a functional schematic of the signal strength processor illustrated in FIG. 7.

It will be appreciated that signal strength can be detected by the signal strength processor 29, or it can be predicted based upon historical models of signal strength. A function block diagram depicting a hardware implementation for performing the functions of the signal strength processor 29 will now be described in conjunction with FIG. 8. It will be appreciated by those skilled in the art that these functions could also be implemented using a suitably programmed microprocessor. The total composite signal received by the antenna 26 is squared in multiplier 100, and integrated in an integrator 106 over the number of chip periods in a bit period. A bit clock signal determines the integration interval. A square root circuit 107 determines the root mean square (RMS) value of the composite signal over the bit period.

At the same time, the residual signal is received in a multiplier 102. The residual signal comprises the total composite signal minus any prior decoded signals. The residual signal is multiplied by a spreading code generated by a local code generator 104 of the signal to be decoded. The correlated output signal from the multiplier 102 is also integrated over the same bit period in an integrator 108, as controlled by the bit clock signal. As described, for example, with respect to the signal graphs (e) and (f) in FIG. 3, the average or integrated voltage value over the integrated time period may have a positive or a negative polarity. Thus, a bit polarity decision device 110 detects the signal polarity and transmits a signal to an absolute value device 114 which insures that the sign of the integrator 108 output signal, delayed by a delay 112, is always positive. The absolute value device 114 may be, for example, an inverter controlled by the bit polarity decision device 110.

The absolute value of the average correlation signal (B) is divided in a divider 116 by the square root of the RMS value of the total composite signal squared ($A^2$) for the same bit period to generate a normalized value. In other words, the correlation strength of the decoded signal B is normalized by dividing it by the total composite strength of the signal for that bit period. The normalized correlation of the decoded signal is accumulated in a signal averager 118 over a number of bit periods to generate a relative mean strength for that decoded signal. Due to multipath fading of the signal, the actual number of bit periods should probably be on the order of about ten in order to determine an accurate average signal strength of the demodulated signal. Each local code is stored in a memory 120 along with its associated average strength value. A sorter 122 compares each of these average signal strength values and sorts them from strongest to weakest. At that point, the sorter 122 transmits the local spreading code of the strongest signal to the local code generator 104 so that the strongest signal is always demodulated and extracted at the next data bit period. Lesser strength signals are demodulated in order of signal strength as determined by the sorter 122. The sorter 122 functions may be readily implemented by a microprocessor using a software sorting program.

Because the signal strengths of the multiple mobile stations in a cell are constantly varying, a further embodiment of the present invention utilizes linear predictive analysis (LPA) to reorder the signal strength priority. In general terms, a historical model of the relative signal strengths is stored in a memory and used to extrapolate which signal is most likely to have the greatest strength at the next instant in time. LPA postulates that the next value of a waveform will be a weighted sum of previous values with the weight coefficients to be determined. The known Kalman filter algorithm may be used to implement this analysis. In this manner, the strongest signal may be predicted effectively without having to actually perform another sequence of signal decoding and measurements.

If the signal strength processor 29 determines that the actual results of the decoding of the composite signal and signal strength priority sequence is in error because of an inaccurate prediction or because system conditions have changed, the signal strength processor 29 reorders the code sequence to reflect the actual signal strength order. Subsequently, the demodulation process may be repeated to insure that the individually coded signals of the composite signal are decoded in the order of greatest to least signal strength. The repeated process does not result in any loss of data or interruption in traffic because the composite signal is stored in a delay 50 in the processing block 40. The delay 50 may be simply a memory device. Consequently, the composite signal may be retrospectively reprocessed once the optimum order of decoding is determined.

By correlating the output signal of the first code generator 32 with the composite signal received at the correlator 30, an individual signal corresponding to the first code is extracted from the composite signal. The correlated signal is filtered in a low pass filter 42 in order to reject interference generated by noise and unrelated signals. Instead of the low pass filter 42, a majority vote circuit or an integrate and dump circuit may be used to reduce or despread the bandwidth or bit rate of the correlated signal. The output signal generated by the low pass filter 42 is processed further in an error correction decoder 44 which finally reduces the signal bandwidth or bit rate to the underlying digital information. The decoded, information signal may undergo additional signal processing before it reaches its final destination.

The error corrected output signal is also applied to a recoder/remodulator 46 to reconstruct the waveform of the signal just decoded. The purpose for reconstructing/recoding the decoded signal is to remove it from the composite signal in a subtractor 48. A delay memory 50 stores the composite signal for the processing time required to first decode and then reconstruct the first decoded signal.

The residual composite signal, from which the first signal has been decoded and subtracted, is passed from the subtractor 48 to the input of a second digital processing block 40' similar to the first block 40. The only difference between the two digital processing blocks 40 and 40' is that the code generator 32' is programmed to match the code corresponding to a second signal to be demodulated. In the preferred embodiment of the invention, the second signal to be demodulated is the signal having the next greatest signal strength. Those skilled in the art will recognize that the second signal processing block 40' may be implemented by recursive use of the first signal processing block 40 in order to avoid duplicating hardware. The second signal processing block 40' produces a second, decoded signal from the error correction decoder 44' and subtracts a reconstructed, second signal from the delayed composite signal in a subtractor 48'. The residual, composite signal, with two signals now removed, is passed to a third stage of signal processing and so on.

It will be appreciated that a key element of the present invention is that the sequence of demodulation and extraction of individual information signals is in the order of highest signal strength to lowest signal strength. Initially, when the composite signal includes many signals, the signal most likely to be detected accurately is the signal having the greatest signal strength. Weaker signals are less likely to interfere with stronger signals. Once the strongest signal is removed from the composite signal, the next strongest signal may be readily detected without having to account for the interference of the strongest signal. In this fashion, even the weakest signal may be accurately decoded. Because of this enhanced decoding capability, the present invention performs satisfactorily even with a significant increase in the number of users typically handled in conventional CDMA systems. Thus, increased capacity is achieved.

By increasing the number of mobile accesses over the same communications channel, a steady-state level of activity is achieved in which the signal strength processor 29 continuously determines the relative instantaneous levels of all information signals being processed. The ultimate capacity limit of this system is reached when the power of a signal is exceeded by the sum of the powers of all lower power signals by more than the available processing gain (less any desired signal-to-noise ratio). This limit, however, is considerably more favorable than the conventional limit which is reached when the sum of the power of all the stronger signals exceeds the power of the weakest signal by more than the available processing gain.

In estimating the capacity gain, the Rayleigh distribution is used as a representative signal level distribution in a cellular telephone environment. Assuming use of feedback power control, the long-term mean strength of all signals is unity. Consequently, the signal strength power exhibits the distribution function:

$$P(A)dA = 2A \exp(-A^2)dA$$

where A is the signal amplitude. The total power P of a large number N of such signals is simply N. If the processing gain or spreading ratio is R, the signal-to-interference ratio after despreading would be approximately $$S/I = A^2 R/N$$

for a conventional CDMA system. If S/I equals 1, signals of amplitude less than SQRT(N/R) would therefore not reach zero dB (equal power ratio) with respect to the interference after demodulation. If this is the threshold for acceptable decoding, a certain number of signals $$1 - e^{(-N/R)}$$

will not be decodable, and a certain number of signals $$e^{(-N/R)}$$

will be decodable. Thus, the maximum number of signals that can be decoded is $$N\, e^{(-N/R)}$$

When N is chosen to be equal to R, the number of decodable signals becomes N/e. Thus, the loss due to the signal strength distribution is a factor e. In practice, it is doubtful that this capacity could be reached while providing an adequate quality of service in a cellular system, as those signals that were decodable at one instant would belong to one set of mobiles and to another set of mobiles at another instant. To ensure that every mobile information signal is decodable 95% of the time, for example, would entail a substantial loss in capacity. This further loss is the margin that must be built in to the system capacity to allow for signal fading.

In the case of the present invention, however, each signal suffers from interference only from those having less than or equal amplitude. Those signals having a higher signal strength or amplitude have been demodulated first and removed.

The integral of all interference I up to an amplitude A is given by $$1 - (1 + A^2)\exp(-A^2)$$

The signal-to-interference ratio S/I after despreading a signal of amplitude A is thus $$\frac{S}{I} = \frac{R}{N} A^2/(1 - (A^2 + 1)\exp(-A^2))$$

Figure 9:
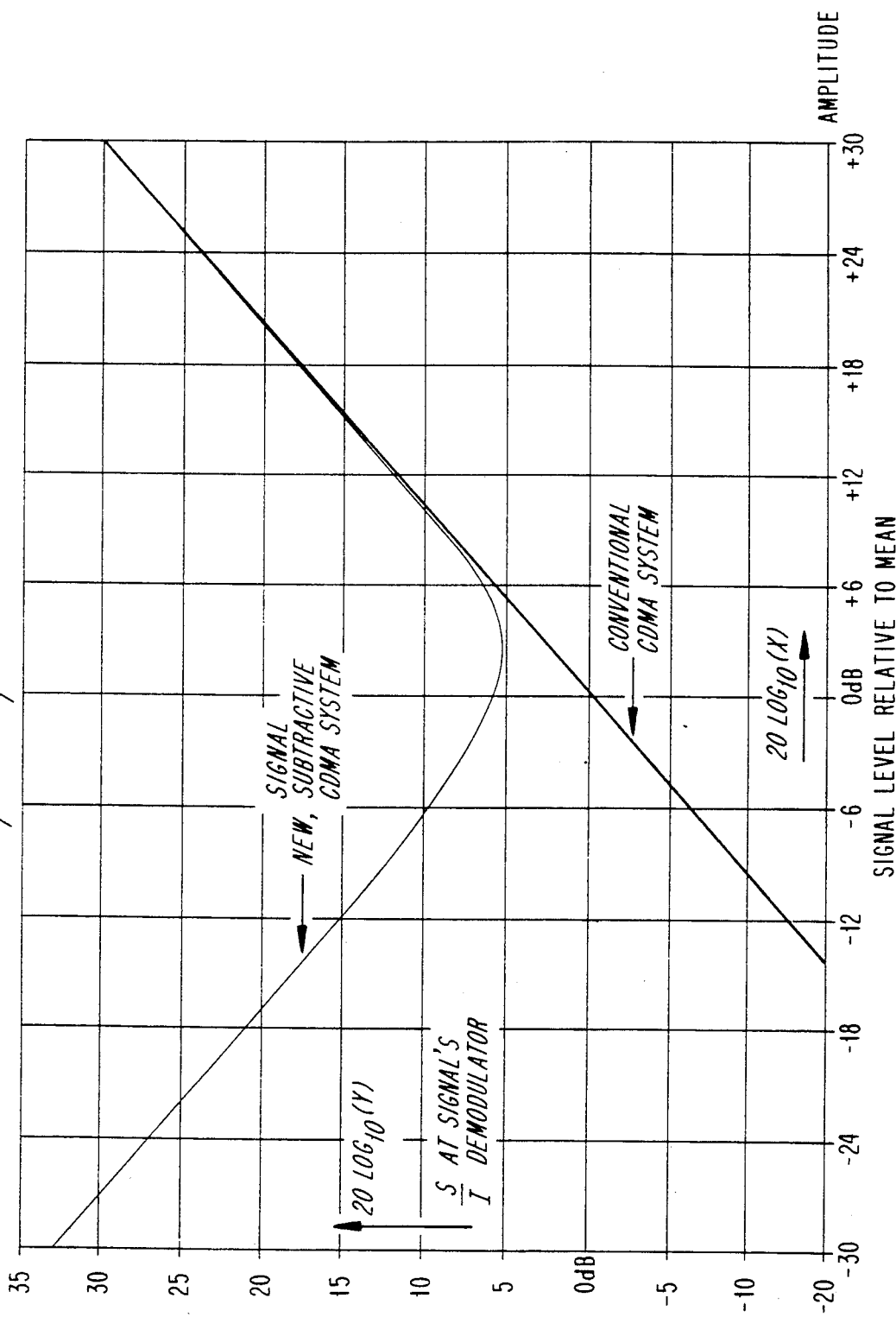
FIG. 9 is a graph comparing the signal-to-noise ratio of conventional CDMA with that of subtractive CDMA according to the present invention.

FIG. 9 is a plot of the function $$A^2 / (1 - (A^2 + 1)\exp(-A^2))$$

showing that it is never less than 5.8 dB (3.8:1 power ration), with the minimum occurring at $A^2 = 1.79$. The S/I improves for signals having an amplitude larger than $(1.79)^{\frac{1}{2}}$ due to their greater power. In contrast with conventional CDMA systems, the S/I in the present invention, also improves for signals having an amplitude smaller than $(1.79)^{\frac{1}{2}}$ because fewer unsubtracted, interfering signals remain below this signal level.

Consequently, all signals are decodable provided that $$R/N > 1/3.8$$

that is $$N < 3.8R$$

Compared to the conventional CDMA demodulator capacity limit of $$N < R/e \text{ (without fading margin)}$$

the invention has a capacity advantage of 3.87e which is more than a tenfold increase. In addition, conventional systems have a significant fading margin. In the present invention, even the weakest, faded signals (at least with regard to interference with other signals and neglecting other noise sources), may be decoded accurately. Accounting for the fading margin, the capacity increase of the present invention is approximately 100 times greater than conventional CDMA systems.

It should be noted that the system capacity is limited only because of the possibility that the first signals being processed may be the weaker rather than the stronger signals. However, by taking advantage of the storage of the composite signal in the delay memory 50 and the ability to reprocess the composite signal retrospectively, a multiple-pass demodulation procedure may be applied to the composite signal. Of course, this procedure would only make a difference if the first pass demodulation produced errors in the decoded signals. Accordingly, redundant coding is preferably used to indicate the confidence in a decoded signal result. Based on that confidence code, the processing block 40 decides whether further passes will yield an improvement. One well known redundant coding procedure for assigning a confidence value to a particular decoding result is the majority vote technique. For example, if five redundant signals are compared and 4 or 5 have the same value, then a high confidence value is assigned to the result. The fewer signals that agree, the lower the confidence value. If the confidence value is high, no further demodulation passes are necessary. Conversely, a low confidence value dictates that the signals be re-sorted, and any signals having a greater strength be removed.

Figure 3:
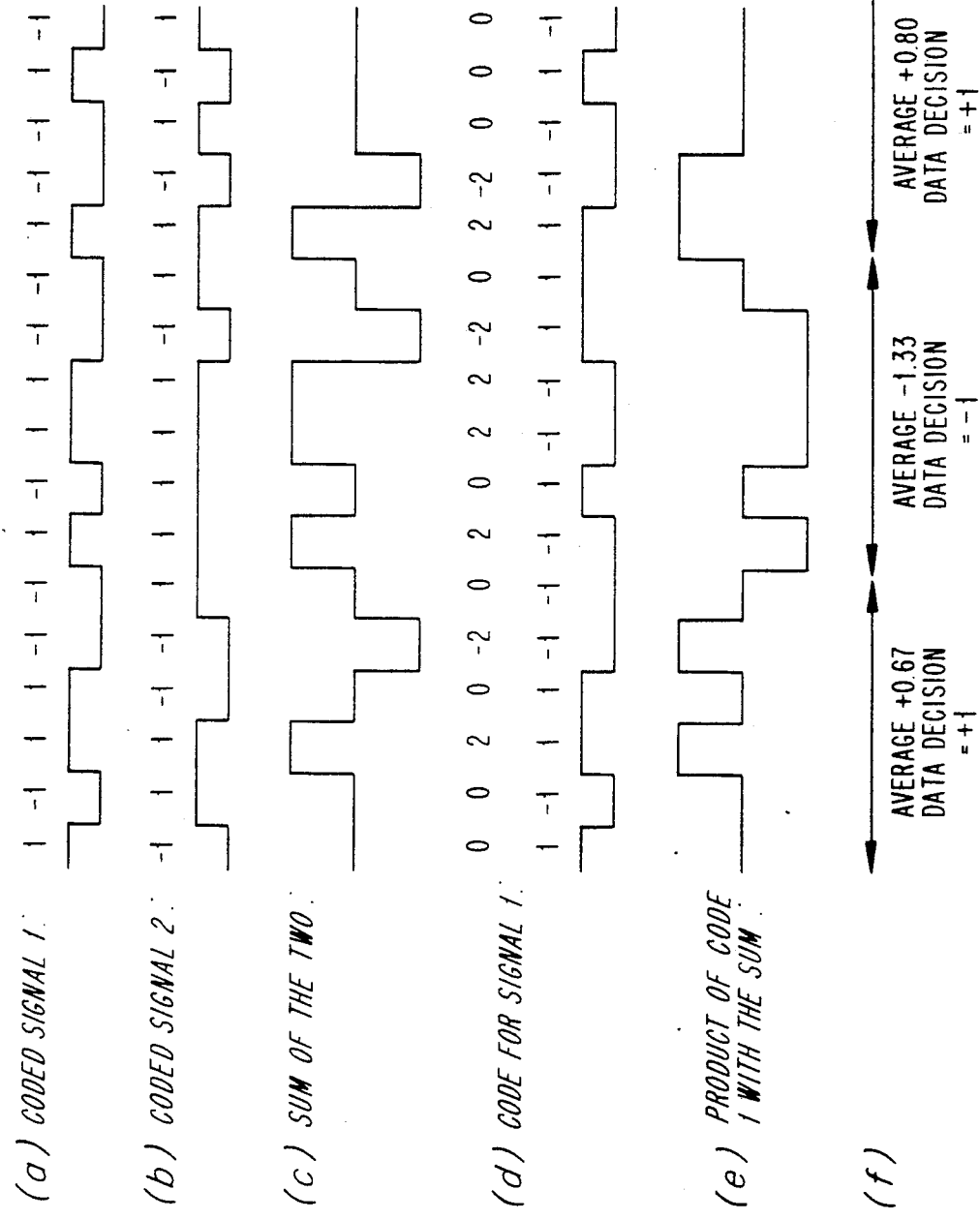

While the principles of continuous spreading codes were described initially in conjunction with FIGS. 3–5, superior methods of spreading the spectrum of an information signal may be achieved using error correction coding. When a single binary information bit at a time is bandwidth expanded by a spreading ratio R to become a pseudo-random sequence of R bits, the bandwidth is spread without any error correction coding gain. As such, this technique may be termed simple spreading. On the other hand, spreading a block of M information bits at a time, where M>1, to a pseudo-random sequence of M×R bits provides error correction coding gain within the same spreading factor. This latter technique is termed intelligent spreading.

Simple spreading may be regarded as converting an information signal as one of two possible coordinates $(-1)$ or $(+1)$ in a one dimensional space, e.g., on a line, into a signal that needs R dimensions to display it. A coordinate in any R dimensions may have only two possible values $-1$ or $+1$ (in Boolean notation 0 or 1). Such spaces are known as Galois fields. Correlating a signal with a code may be equated to finding its projection on a vector from the origin through a point whose coordinates are given by the bits of the code. Maximum correlation or projection of the signal is achieved if the end point of the signal vector and the code vector coincide. Coincidence occurs when no angle exists between the signal vector and the code vector. When a signal consists of a sum of signals, one of which coincides with the code, the others being at right angles to that code, correlation of the signal with that code yields a complex, correlation product corresponding to the desired signal demodulated. The other signals do not contribute to the resulting magnitude of the correlation product because they have zero projection on the correlation line I+jQ.

More generally, a sum of randomly coded signals may include one signal which coincides with a correlation code, the others having random projections on the code correlation line or vector. If the total length squared of any one of these other signals is, by Pythagoras, $$a1^2 + a2^2 + a3^2 \ldots \text{ where } a1, a2, a3 \ldots$$

are the projections on a number of different vectors or axes, then on average 1/R of the total squared length (or power) appears in any one dimension. Upon correlating with 10 the first signal's code and subtracting a corresponding amount of the code vector, the residual signal has a zero projection along the code vector. Essentially, the signal has been projected onto a plane or subspace of R-1 dimensions, with 1/R of its power lying along the code correlation line having disappeared.

This loss of the total power along the code correlation line is termed the "correlative loss" of power of the remaining signals which occurs when a first signal is correlated with its own code and that first signal is subtracted from the total or composite signal. If the signals were all orthogonal, no such loss would occur. Otherwise, an average loss of 1/R, where the spreading ratio R is essentially the number of chips in the correlation of each remaining signal's power, occurs upon extraction of a prior, demodulated signal. An attempt to demodulate and extract R or more signals, with their respective codes spanning the whole R-dimensional space, would result in all vector components in all dimensions being removed after extraction of the Rth signal. No signal would be left to demodulate. The present invention allows more than R overlapping signals to be demodulated by reducing the correlation loss.

The magnitude of a demodulated signal to be subtracted from the composite signal may be based either on the signal amplitude after correlative despreading of the current information bit or on the signal amplitude of the previous information bit. The previous bit error is based on the values of the other signals that made up the composite signal when the previous bit was demodulated and removed. The present invention estimates the optimum amount of a decoded signal to be subtracted by employing at least several past amplitude measurements in a sequential estimation technique, such as a Kalman filter, which can be adapted to follow the fading pattern of a signal.

In another preferred embodiment of the present invention, signals are evaluated using "intelligent spreading" based on orthogonal or bi-orthogonal block coding of the information to be transmitted. In orthogonal block coding, a number M of bits to be transmitted are converted to one of $2^M$ available $2^M$-bit orthogonal codewords. A set of codewords can be constructed as follows:

The trivial case M=1 produces two, 2-bit words $$W0 = |00|$$
$$W1 = |01|$$

which is regarded as a 2×2 bit matrix $$M1 = \begin{vmatrix} 00 \\ 01 \end{vmatrix}$$

The case for M=2 may be constructed by forming a 4×4 bit matrix M2 by means of the following recursion relation:

$$M2 = \begin{vmatrix} M1 & M1 \\ M1 & \overline{M1} \end{vmatrix} \quad \text{and in general}$$

$$M(i+1) = \begin{vmatrix} Mi & Mi \\ Mi & \overline{Mi} \end{vmatrix}$$

These matrices are known as Walsh-Hadamard matrices.

Decoding these orthogonal codes involves correlation with all members of the set of code words. The binary index of the codeword giving the highest correlation yields the desired information. For example, if a correlation of 16, 16-bit codewords numbered 0 to 15 produces the highest correlation on the tenth 16-bit codeword, the underlying signal information is the 4-bit binary word 1010 (10 in binary). Such a code is also termed a [16,4] orthogonal block code and has a spreading ratio R equal to 16/4=4.

If the Walsh-Hadamard matrices are augmented using the complementary codewords, (all 16 bits are inverted), one further bit of information may be conveyed per codeword. Thus, 5 bits of information are conveyed by transmitting one of 16 codewords or one of their 16 complements, providing a total choice of 32. This type of coding is known as bi-orthogonal coding. For higher spreading ratios, a [128,8] bi-orthogonal block code may be used, having a 16:1 spreading ratio. Indeed, [256,9], [512,10], ... [32768,16] ... etc. bi-orthogonal block codes may be used.

Using modulo-two addition, a scrambling code may be added to the block code to insure that the coding is different for each signal. The scrambling code may even change randomly from block to block. Modulo-2 addition of a scrambling code corresponds, in a Galois field, to applying an axis rotation. The scrambling code may be descrambled by modulo-2 adding the correct scrambling code a second time at the receiver to align the axes once more with the codewords of the Walsh-Hadamard matrix.

A significant feature of the present invention is that simultaneous correlation with all the orthogonal block codewords in a set may be performed efficiently by means of the Fast Walsh Transform. In the case of a [128,7] code for example, 128 input signal samples are transformed into a 128-point Walsh spectrum in which each point represents the value of the correlation of the composite signal with one codeword. Such a transform process will now be described. With reference to FIG. 10, a serial signal sample collector 60 takes a number of samples in series from the receiver equal to the number of bits in the coded word, e.g., 128, and stores them in an internal, buffer memory, and converts them to parallel format. A descrambler 62 removes a scrambling code by either inverting a signal sample or not according to the corresponding bit polarity of the scrambling code. The samples are transferred in parallel to the Fast Walsh Transform Block Decoder 64 which generates the Walsh spectrum. In other words, a number of values are generated representing the degree of correlation between the composite signal received and each of the orthogonal codewords. The signal whose axes were correctly aligned in the Galois field by the descrambling operation yields one dominant component in the Walsh spectrum whose index and sign convey 7 bits of information. Other components of the spectrum are caused by noise and differently scrambled signals.

A comparison processor 66 determines which correlation has the largest magnitude and sets that signal to zero by opening the corresponding switch 67. In this manner, the demodulated signal is subtracted effectively from the composite signal. The remaining spectrum with one component removed is processed in an inverse Fast Walsh Transform Block Recoding Circuit 68 and re-scrambled with the same scrambling code in a rescrambler 70 to reconstruct the original 128 signal samples minus the just-decoded signal. The magnitude of the correlated signal is representative of signal strength and is stored in a sorting processor 69 along with its corresponding scrambling code. The processor 69 orders the scrambling codes from greatest to weakest correlated signal magnitudes. The code with the greatest magnitude is then transmitted to the descrambler 62 for the next signal demodulation.

The residual, composite signal, with a first decoded signal removed according to the subtractive principle of the invention, is descrambled again using the descrambling code of a second signal to be decoded and submitted to a second Fast Walsh Transform operation for decoding, and so on. As described previously, the order in which signals are decoded and subtracted by the above means is governed by the order of use of the descrambling codes, which in the preferred embodiment are in descending order of the predicted strengths of their corresponding information signals. This process is repeated a number of times to decode a number of signals.

While only one fast Walsh Transform block decoder 64 has been shown, two fast Walsh Transform block decoders are in fact used in parallel to process the real and imaginary correlation magnitudes of the descrambled signal. Accordingly, the comparison processor 66 detects 128 real and 128 imaginary correlations and determines 128 complex correlation magnitudes by calculating the square root of the sum of the squares of the real and imaginary components. The comparison processor 66 then determines which complex correlation has the greatest magnitude. The real and imaginary components of the selected correlation are analyzed in the complex plane to determine if the phase is changed, e.g. a phase difference of 180° from the previous time that signal was decoded. Two phase possibilities, for example 0° and 180°, allow for one additional bit of information to be transmitted with each 128 code, e.g., in-phase corresponding to a "1" and 180° out-of-phase corresponding to a "0". By taking advantage of this phase difference, bi-orthogonal coding [128, 8] is achieved. As will be recognized by those skilled in the art, additional information bits may be transmitted by taking advantage of smaller phase differences, e.g., 90°, 45°, etc. As described earlier, a Kalman filtering algorithm may be used to track the real and imaginary components of each correlated signal to extract phase information.

The correlative loss involved in the above-described process is as follows. At each stage, the Walsh spectrum component having the greatest correlation, as determined by the comparator 66, is set to zero, effectively removing the signal just decoded. Thus, on average 1/128 of the power is removed from the composite signal. It is recalled that the spreading ratio is 128/8 = 16. Therefore, the correlative loss is only 1/128 of the total power (0.04 dB) per decoded signal, compared to 1/16 of the total power for "dumb spreading" of the same spreading ratio. By the use of block coding or a similar form of intelligent spreading, the subtractive demodulation according to the present invention may be employed to decode and extract from a composite signal a number of information-bearing signals that exceed the bandwidth expansion ratio of the code, without encountering excessive correlative loss.

In the context of mobile radio telephones in cellular systems, different signals originate from different transmission mobile stations or portable radio telephones located at different distances from a base station. As a result, multiple bursts of codewords relating to one signal are not necessarily time-aligned at the receiver. This disparity in time-alignment may be overcome if after each decoding stage, the residual signals in the composite signal are converted back to a serial stream of samples. Prior to processing a new, next signal, that serial stream of samples is combined with the new signal sample and converted into parallel format using the block timing appropriate to the next signal. These tasks may be performed entirely by appropriate address and data manipulations within a buffer memory included in the digital signal processing block.

A typical propagation path between mobile radio telephones and a base station receiver consists not only of a shortest, line-of-sight path but also a number of delayed paths or echoes due to reflection from mountains, tall buildings, etc. In many dense urban environments, the propagation path may consist only of such echoes. Any direct path, if present, may be too difficult to identify. If the total delay between propagation paths is small compared to the reciprocal bandwidth of the signal, fading results because of the multiple paths adding sometimes constructively and sometimes destructively. However, the signal may be successfully demodulated by assuming that only a single wave exists. On the other hand, a signal having path delays that are large compared with the reciprocal bandwidth (1/bandwidth in hertz) must be treated as having primary and secondary waves. It is usually possible, however, to express the total signal as the sum of a finite number of paths delayed by multiples of the bit period. Each path may be effected by independent amplitude fading and phase rotation due to fractional bit-period delays. In this situation, the present invention employs a type of a conventional decoder known as a RAKE receiver to integrate information from bit-period delayed paths. The RAKE receiver correlates the despreading code with the current signal samples as well as the signal samples delayed by one bit period, the signal samples delayed by two bit periods, etc., and combines the correlation results before determining the information content of the signal.

Delayed versions of the input signal are processed in the Fast Walsh Transform decoder 64 and the Walsh spectra are added before determining the largest Walsh component. The Walsh spectra may be added either non-coherently, with or without weighting, or coherently with an appropriate relative phase rotation and weighting. In either case, Fast Walsh Transforms are performed on both the real and imaginary vector components of the signal, as described previously, yielding real and imaginary components of the Walsh spectra. In non-coherent addition, only the magnitudes of corresponding complex Walsh spectral components are added and weighted before determining the largest components. In coherent addition, prior knowledge of the relative phase shift between the signal paths is used to phase-align corresponding Walsh components before addition.

Phase-alignment is accomplished by means of a complex multiplication that can simultaneously include an amplitude weighting. If the path phase shift is known by initially transmitting a known signal, for example, that phase shift may be used to rotate corresponding Walsh components until they align on a single axis, and the Walsh component having the largest value on this axis is determined. This technique reduces the effect of non-coherent interference signals by 3 dB, on average, giving a 2:1 extra capacity increase. Moreover, because only that component (real or imaginary) of the complex Walsh spectrum ascribed to the decoded signal is removed after decoding, the correlative loss experienced by other signals is also reduced. For example, the absolute phase shift of the signal paths may be tracked by processing the actual phase shifts of the Walsh components ascribed to the desired signal in a digital phase tracking loop.

In the same way that energy arising on different signal paths may be utilized by combining the results of multiple despreading correlations, the signals arriving on different antennas may be combined to form a diversity receiving system. If an array of antennas is connected to an array of correlating receivers through a beam-forming network, preference may be given in a particular receiver to signals arising from a particular range of directions. For example, in one of a bank of receivers, a signal S1 from a northerly direction may have the greatest signal strength because the antenna beam formed to that receiver points north. In a receiver associated with a southerly pointing beam, the strength of the signal S1 is reduced and a second signal S2 appears greatest. Consequently, the order of demodulation and extraction of signals may differ in two or more receivers and the same signal may be demodulated at a different point in the signal-strength prioritized sequence and with different remaining interference signals present. It is clear that the results of such multiple diversity demodulations can be combined in a variety of ways that will be apparent to those skilled in the art in order to obtain further advantages.

While a particular embodiment of the present invention has been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A multiple access, spread spectrum communications system for communicating information signals between plural stations using code division spread spectrum communications signals, each station comprising:
   transmission means for spreading an information signal with a corresponding spreading code and for transmitting a spread-coded signal, and
   receiving means for receiving a composite signal of plural, overlapping spread-coded signals, including:
   code ordering means for ordering individual spreading codes in an order according to relative strengths of said information signals;
   decoding means for recursively decoding said composite signal with a first ordered spreading code received from said code ordering means to generate a series of decoded signals;
   recoding means for successively recoding said decoded signals using corresponding spreading codes to generate a series of recoded signals;
   signal removal means for successively removing said recoded signals from said composite signal; and
   code selection means for successively selecting a next, ordered code from said code ordering means.

2. The system according to claim 1, wherein said order of relative signal strength is from greatest to weakest strength.

3. The system according to claim 1, wherein said order of information signals is varied depending on changing system conditions.

4. The system according to claim 3, wherein said decoding means repeatedly decodes said composite signal for each variation in said order to determine an actual signal strength order and wherein said decoding means finally decodes said composite signal based on said actual signal strength order.

5. The system according to claim 1, wherein said receiving means includes a memory for storing said composite signal received by said receiver, and said signal removal means includes a subtractor for subtracting said decoded signal from said composite signal stored in said memory.

6. The system according to claim 5, wherein said code ordering means includes:
signal strength detecting means for detecting an actual signal strength of each of said information signals,
reordering means for reordering said spreading codes based on said detected signal strengths, and
wherein said decoding means retrospectively decodes said composite signal stored in said memory based on an order of spreading codes received from said reordering means.

7. A system according to claim 1, wherein said transmission means includes modulation means for modulating a radio frequency carrier wave with said spread coded information signal and said receiving means includes demodulation means for demodulating said composite signal and transmitting a demodulated, composite signal to said decoding means.

8. A multiple access, spread spectrum communications system for communicating information signals between plural stations using code division spread spectrum communications signals, each station comprising:
a transmitter including:
means for spreading an information signal with a corresponding, spreading code;
a scrambling means for adding a scrambling bit sequence to said spread information; and
means for transmitting said scrambled, spread-coded information signal; and
receiving means for receiving a composite signal of overlapping, transmitted signals including:
descrambling means for descrambling said composite signal using a scrambling bit sequence; and
decoding means for recursively decoding said composite signal by correlating spreading codes to generate a series of decoded signals.

9. The system according to claim 8, said receiving means further comprising:
recoding means for successively recoding said decoded signals using corresponding spreading codes to generate a series of recoded signals;
rescrambling means for rescrambling said recoded signals using said scrambling bit sequence;
signal removal means for successively removing said rescrambled signals from said composite signal; and
code selection means for successively selecting a next spreading code.

10. The system according to claim 9, wherein said scrambling means and rescrambling means include a modulo-2 adder for adding a scrambling bit sequence to said spread information.

11. The system according to claim 10, wherein said descrambling means adds said modulo-2 scrambling bit sequence to said composite signal to perform said descrambling.

12. A multiple access, spread spectrum communications system for communicating information signals between plural stations using code division spread spectrum communications signals, each station comprising:
a transmitter including:
coding means for coding blocks of bit sequences of an information signal, and
means for transmitting said block-coded information signal; and
receiving means for receiving a composite signal of overlapping, transmitted signals, including:
correlation means for recursively correlating said composite signal with block codes corresponding to said information signals;
comparison means for determining a block code that generates a greatest correlation and for producing a correlated signal;
signal removal means for successively removing said correlated signal from said composite signal; and
inverse correlation means for recoding a residual portion of said correlated, composite signal using said corresponding block codes to generate a series of recoded signals.

13. The system according to claim 12, wherein said block codes are formed using Walsh-Hadamard matrices.

14. The system according to claim 12, wherein said block codes are orthogonal block codes.

15. The system according to claim 12, wherein said block codes are bi-orthogonal block codes.

16. The system according to claim 12, wherein said transmitter further includes:
scrambling means for adding a scrambling bit sequence to said block-coded information; and
said receiving means further includes:
descrambling means for descrambling said composite signal using a selected scrambling code corresponding to one of said information signals; and
rescrambling means for rescrambling said residual portion of said composite signal using said selected scrambling code.

17. The system according to claim 16, further comprising:
code selection means for ordering individual scrambling codes according to relative signal strengths of said information signals and selecting a scrambling code having a greatest signal strength.

18. The system according to claim 12, said receiving means further comprising:
sampling means for generating N samples of said composite signal.

19. The system according to claim 18, wherein said correlation means is a Fast Walsh Transformation circuit for transforming N signal samples into an N-point Walsh spectrum where each point represents a correlation value corresponding to a single one of said block codes.

20. The system according to claim 19, wherein said signal removal means includes means for setting a point with a greatest magnitude to zero.

21. The system according to claim 20, wherein each point is a complex number having a real and an imaginary vector component and said comparison means includes means for determining a complex number having a greatest magnitude.

22. The system according to claim 20, wherein each point is a complex number having a real and an imaginary vector component and said comparison means includes means for determining a complex number having a greatest projection on a line at a particular angle and a sign of said projection relative to a particular direction along said line.

23. The system according to claim 20, wherein each point is a complex number having a real and an imaginary vector component and said comparison means includes means for determining a point having a correlation with a greatest projection on a line at a particular angle and a sign of said projection relative to a particular direction along said line.

24. The system according to claim 20, wherein each point is a complex number having a real and an imaginary vector component and said comparison means includes means for determining a point having a correlation with a greatest real component and a greatest imaginary component.

25. The system according to claim 12, wherein said inverse correlation means is a Fast Walsh Transformation circuit.

26. The system according to claim 12, wherein said correlation means and said inverse correlation means include identical transformation circuits.

27. A system according to claim 12, wherein said receiving means further comprises:
bit shifting means for generating bit-shifted versions of said block codes and means for detecting delayed echos and pre-echos of said composite signal.

28. A communications system according to claim 27, wherein said correlation means correlates said composite signal correlation with said bit-shifted codes to determine a codeword with a greatest probability of having been transmitted.

29. A system according to claim 28, wherein echos of a previously decoded signal are subtracted from said composite signal.

30. In a multiple access, spread spectrum communications system for communicating information signals between plural stations using code division spread spectrum communications signals, a method comprising:
spreading individual information signals from said stations using a corresponding, pseudo-random spreading code, wherein different information signals from different stations may have a same spreading code;
scrambling each said spread-coded information signal using a unique, selected scrambling bit sequence corresponding to one of said stations;
transmitting said scrambled, spread-coded signals from each station;
receiving a composite signal of overlapping, transmitted signals;
descrambling said composite signal using one of said unique scrambling bit sequences to distinguish spread-coded information signals from a selected station from other signals in said composite signal; and
recursively decoding said composite signals by correlating selected spreading codes to generate a series of decoded signals.

31. The method of claim 30, further comprising:
selecting a decoded signal having a greatest correlation, said decoded signal corresponding to one of said individual information signals.

32. The method of claim 31, further comprising:
successively recoding said selected decoded signal using said corresponding spreading codes to generate a recoded signal;
rescrambling said recoded signal using said selected scrambling bit sequence;
successively removing said rescrambled signal from said composite signal; and
successively selecting a next spreading code.

33. The method of claim 32, wherein said spreading codes are selected in an order from greatest spread-coded signal strength to weakest spread-coded signal strength.

34. The method of claim 30, wherein said spreading codes are orthogonal block codes.

35. The method of claim 32, wherein said decoding corresponds to a Walsh transformation and said recoding corresponds to an inverse Walsh transformation.

* * * * *